(12) United States Patent
Tokuyama et al.

(10) Patent No.: US 8,956,254 B2
(45) Date of Patent: Feb. 17, 2015

(54) BICYCLE SPROCKET ASSEMBLY

(75) Inventors: Koji Tokuyama, Osaka (JP); Keisuke Hyogo, Osaka (JP)

(73) Assignee: Shimano Inc., Osaka (JP)

( * ) Notice: Subject to any disclaimer, the term of this patent is extended or adjusted under 35 U.S.C. 154(b) by 755 days.

(21) Appl. No.: 13/197,880

(22) Filed: Aug. 4, 2011

(65) Prior Publication Data
US 2013/0035183 A1 Feb. 7, 2013

(51) Int. Cl.
*F16H 55/12* (2006.01)
*F16H 55/30* (2006.01)
*B62M 9/10* (2006.01)
*B62M 9/12* (2006.01)

(52) U.S. Cl.
CPC .. *B62M 9/10* (2013.01); *B62M 9/12* (2013.01)
USPC .......................................................... 474/160

(58) Field of Classification Search
CPC ............ B62M 9/04; B62M 9/06; B62M 9/10; B62M 9/105; B62M 9/12
USPC ............. 474/152–160, 164; 301/110.5, 124.2
See application file for complete search history.

(56) References Cited

U.S. PATENT DOCUMENTS

| 6,039,665 | A | 3/2000 | Nakamura |
| 2006/0172840 | A1 | 8/2006 | Kamada |
| 2007/0054770 | A1 * | 3/2007 | Valle .............................. 474/160 |
| 2008/0004143 | A1 | 1/2008 | Kanehisa et al. |
| 2009/0042679 | A1 * | 2/2009 | Valle .............................. 474/152 |

FOREIGN PATENT DOCUMENTS

| DE | 103 42 638 A1 | 4/2005 |
| EP | 1 074 462 A2 | 2/2001 |

OTHER PUBLICATIONS

European Search Report of corresponding EP Application No. 11 19 4722.2 dated Mar. 23, 2012.

* cited by examiner

*Primary Examiner* — Michael Mansen
*Assistant Examiner* — Juan Campos, Jr.
(74) *Attorney, Agent, or Firm* — Global IP Counselors

(57) ABSTRACT

A bicycle sprocket assembly has a first sprocket with a plurality of first radially protruding portions, a second sprocket with a plurality of second radially protruding portions and a sprocket support member. The second sprocket has more teeth than the first sprocket. The sprocket support member includes a plurality of sprocket mounting portions extending radially outwardly from a freewheel engaging portion. Each of the sprocket mounting portions has first and second sprocket mounting openings for fixing the first and second sprockets, respectively. The first sprocket mounting opening is circumferentially offset from the second sprocket mounting opening with respect to a center rotational axis of the sprocket assembly. The radially innermost edge of the second radially protruding portion is spaced by a radial distance that is smaller than a radial distance of the radially outermost edge of the first sprocket mounting openings with respect to the center rotational axis.

16 Claims, 10 Drawing Sheets

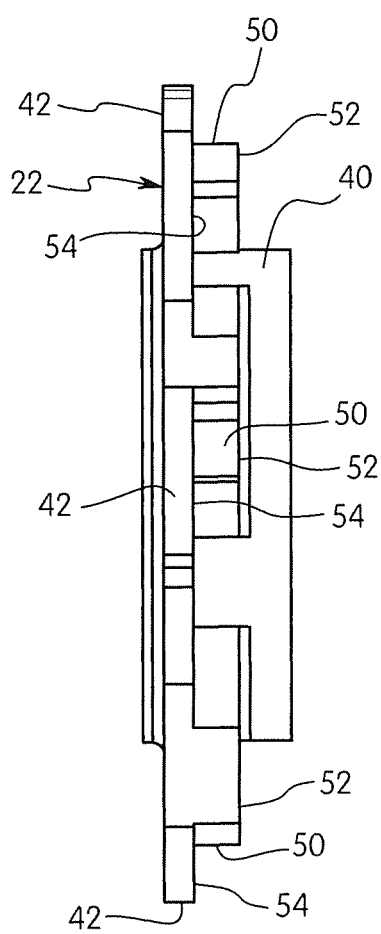
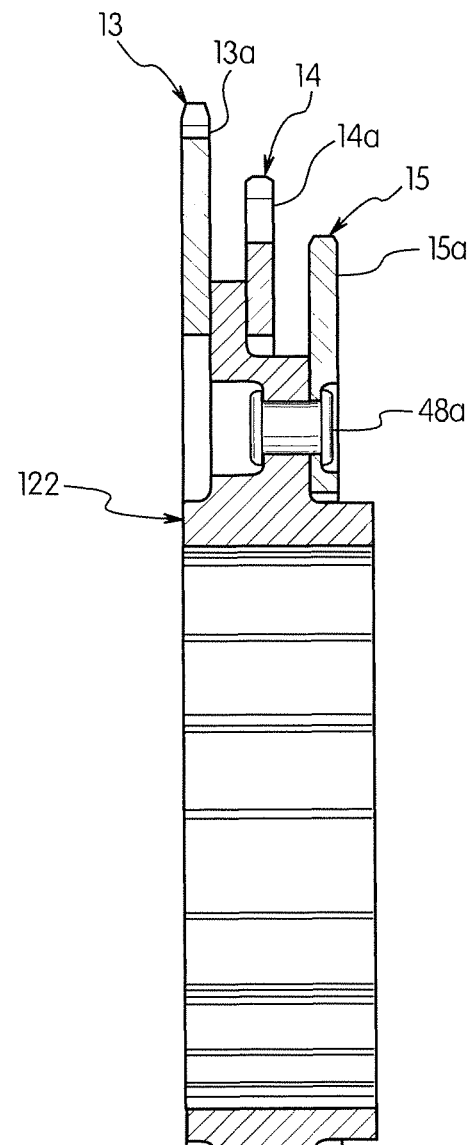
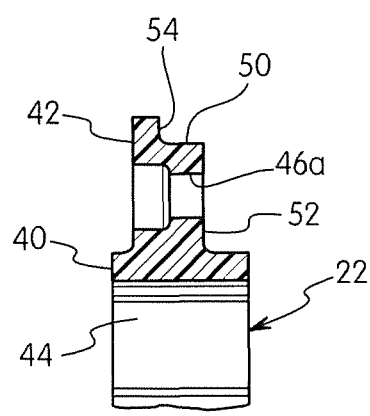
FIG. 13
FIG. 14
FIG. 15

BICYCLE SPROCKET ASSEMBLY

BACKGROUND OF THE INVENTION

1. Field of the Invention

This invention generally relates to a rear sprocket assembly for a bicycle. More specifically, the present invention relates a rear sprocket assembly in which two or more sprockets can be mounted to a bicycle hub assembly using a sprocket support member.

2. Background Information

Most bicycles utilize a chain drive transmission in which a chain is moved between a plurality of front sprockets and a plurality of rear sprockets to change gears. In recent years, bicycle component manufacturers have been manufacturing bicycle transmissions that have more available speeds to the rider. As the available speeds in the bicycle transmission increases, the number of sprockets installed on the rear wheel also usually increases. Accordingly, various attempts have been made in order to increase the maximum number of sprocket that can be installed on a rear hub assembly. For example, some multiple sprocket assemblies use a spider (sprocket support member), which supports a plurality of ring-shaped sprocket wheels on a freewheel of a rear hub. In order to reduce an overall weight of the multiple sprocket assembly that uses a spider, a light metal, such as aluminum, etc., is generally used for the spider, while various types of steel materials are used for the sprockets to provide adequate strength. One example of a multiple sprocket assembly that uses a spider is disclosed in U.S. Pat. No. 6,039,665 (assigned to Shimano Inc.).

SUMMARY

One object of the present invention is to provide a bicycle sprocket assembly that is lightweight compared to a conventional sprocket assembly having the same number of sprockets.

The foregoing objects can basically be attained by providing a bicycle sprocket assembly that at least comprises a first sprocket, a second sprocket and a sprocket support member. The first sprocket includes an outer peripheral portion defining a plurality of first teeth and an inner peripheral portion defining a first opening that is free of any freewheel engaging splines. The inner peripheral portion of the first sprocket has a plurality of first radially protruding portions. The second sprocket includes an outer peripheral portion defining a plurality of second teeth and an inner peripheral portion defining a second opening that is free of any freewheel engaging splines. The inner peripheral portion of the second sprocket has a plurality of second radially protruding portions. A total number of the second teeth is larger than a total number of the first teeth. The sprocket support member includes a freewheel engaging portion and a plurality of sprocket mounting portions extending radially outwardly from the freewheel engaging portion. Each of the sprocket mounting portions has a first sprocket mounting opening and a second sprocket mounting opening. One of the first radially protruding portions of the first sprocket is fixed to the sprocket support member at the first sprocket mounting opening. One of the second radially protruding portions of the second sprocket is fixed to the sprocket support member at the second sprocket mounting opening. The first sprocket mounting opening is circumferentially offset from the second sprocket mounting opening with respect to a center rotational axis of the bicycle sprocket assembly. The radially innermost edge of the second radially protruding portion is spaced from the center rotational axis of the bicycle sprocket assembly by a radial distance that is smaller than a radial distance of the radially outermost edge of the first sprocket mounting openings with respect to the center rotational axis of the bicycle sprocket assembly.

These and other objects, features, aspects and advantages of the disclosed bicycle sprocket assembly will become apparent to those skilled in the art from the following detailed description, which, taken in conjunction with the annexed drawings, discloses one illustrative embodiment.

BRIEF DESCRIPTION OF THE DRAWINGS

Referring now to the attached drawings which form a part of this original disclosure:

FIG. 13 is an edge elevational view of the small or top sprocket support member illustrated in FIGS. 6 and 7 as viewed along a peripheral edge;

FIG. 14 is a partial cross sectional view of the small or top sprocket support member as seen along section line 14-14 of FIG. 7; and FIG. 15 is a cross sectional view of an alternative bicycle sprocket assembly in accordance with another illustrated embodiment.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
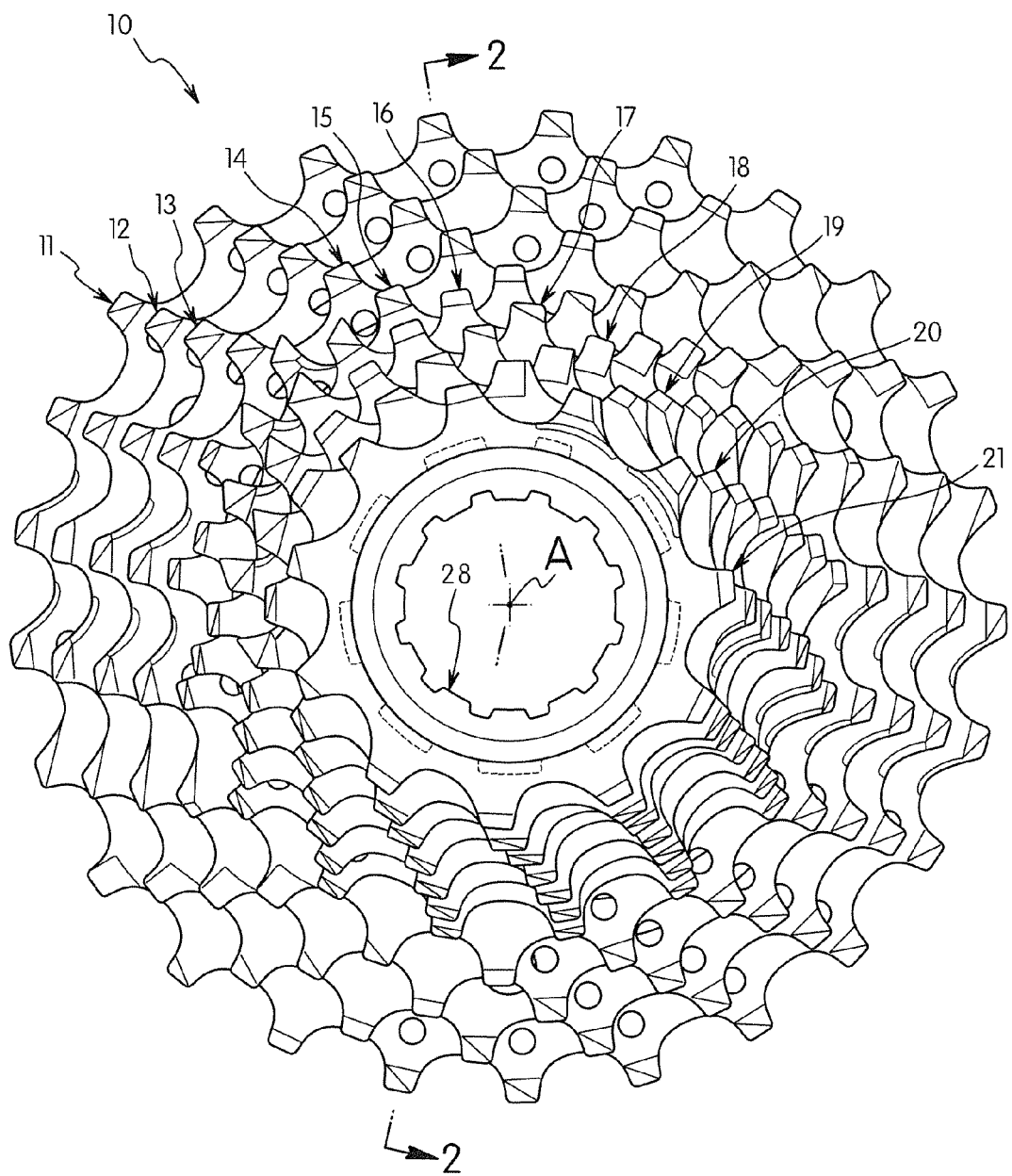
FIG. 1 is a side elevational view of an eleven-stage bicycle sprocket assembly in accordance with one illustrated embodiment.
Figure 2:
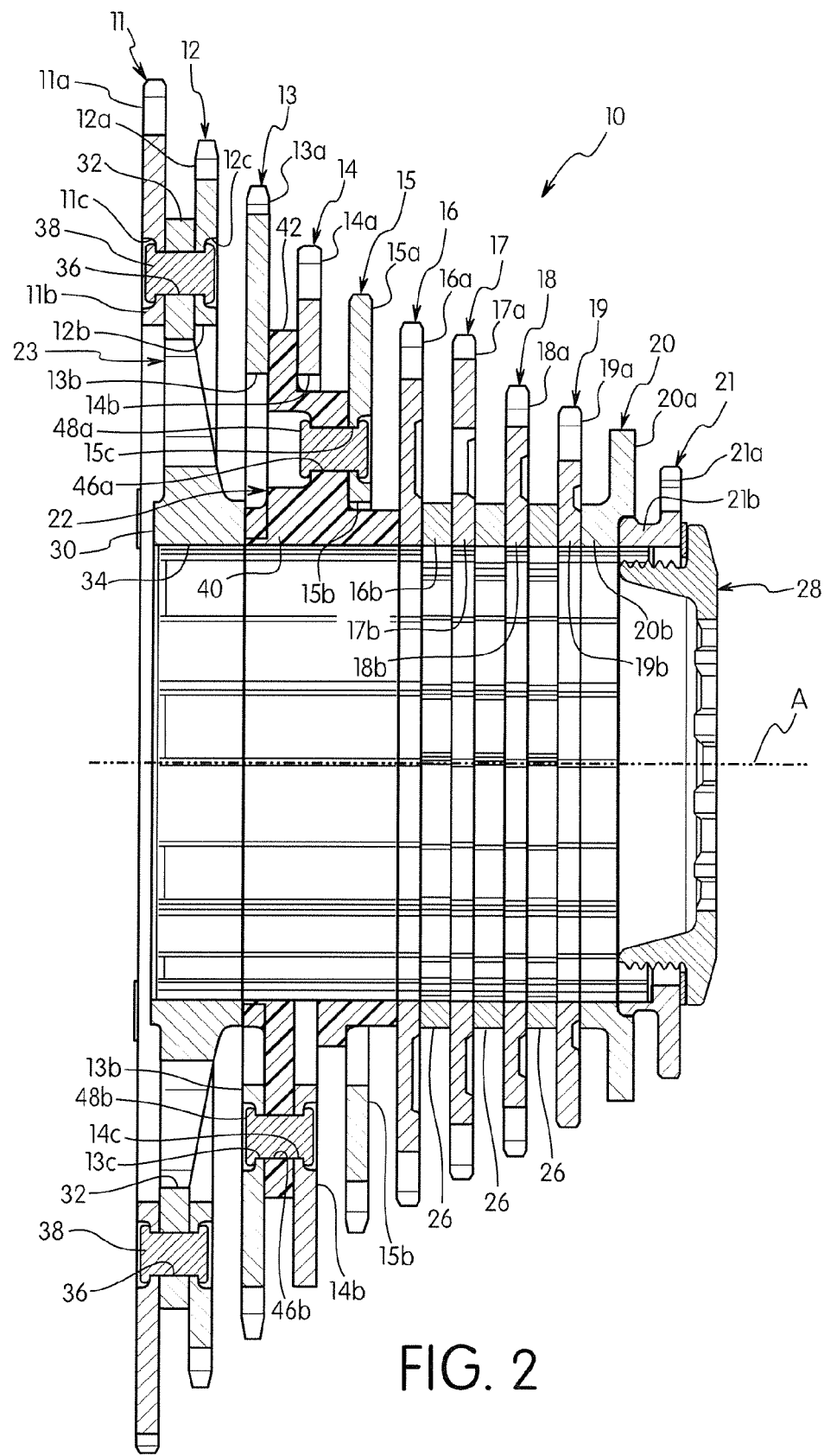
FIG. 2 is a cross sectional view of the bicycle sprocket assembly as seen along section line 2-A-2 of FIG. 1.
Figure 3:
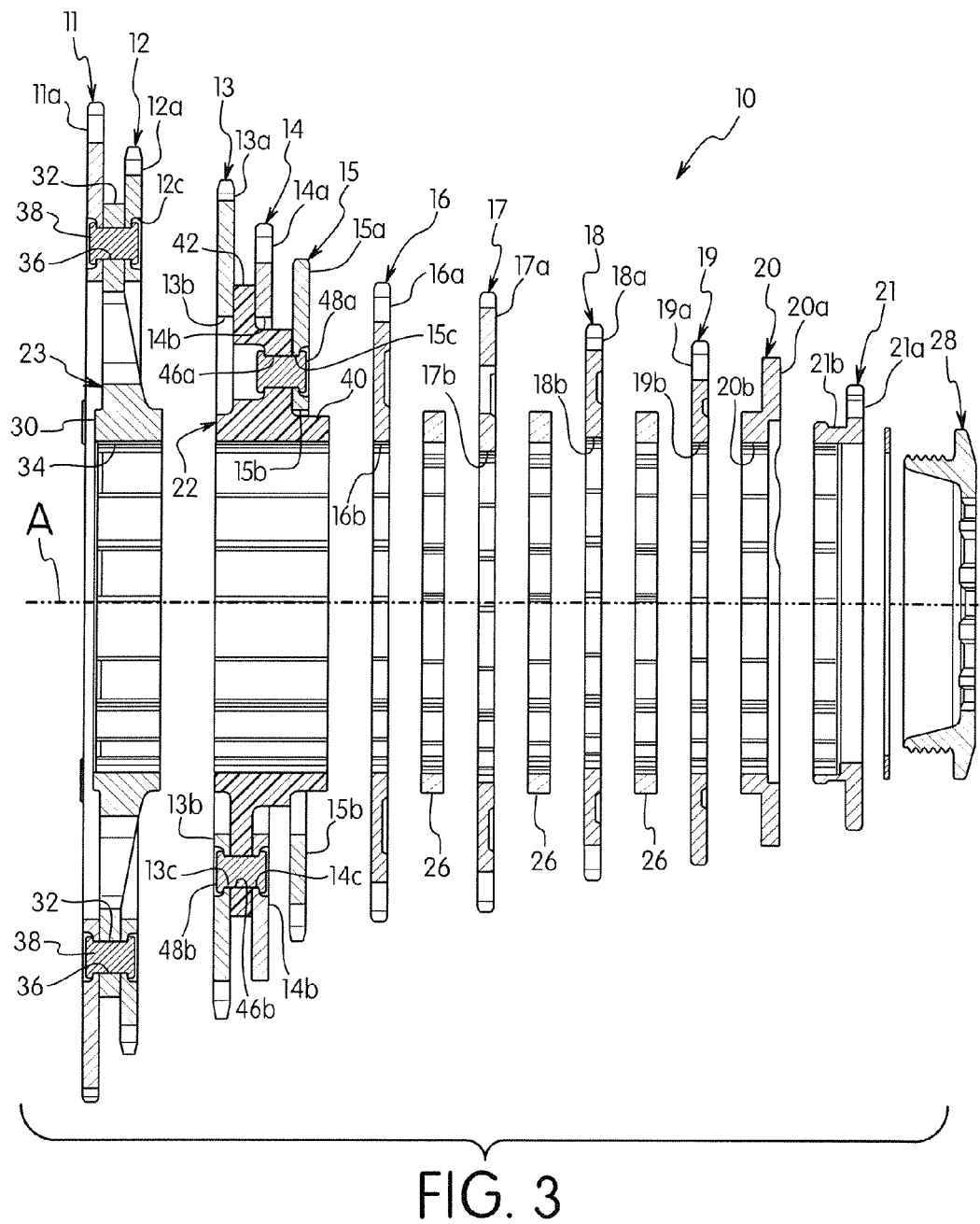
FIG. 3 is an exploded cross sectional view of the bicycle sprocket assembly illustrated in FIGS. 1 and 2.

Referring initially to FIGS. 1 to 3, a rear multi-stage bicycle sprocket assembly 10 is illustrated in accordance with one illustrated embodiment. In the illustrated embodiment, the bicycle sprocket assembly 10 includes a plurality of sprockets 11 to 21. In the illustrated embodiment, for example, the sprockets 11 to 21 have the teeth configuration from the largest sprocket 11 to the smallest sprocket 21 as follows: 25T-23T-21T- 19T 17T 16T 15T 14T 13T 12T 11T. Of course, the bicycle sprocket assembly 10 is not limited to this particular teeth configuration.

As seen in FIGS. 1 to 3, the sprockets 11 to 21 are hard, rigid disc shaped members formed from a suitable material such as a metallic material. In the illustrated embodiment, the sprockets 11 to 21 are each formed as a one-piece, unitary member from a metallic material that is suitable for a bicycle sprocket such as an iron or an iron alloy. The sprockets 11 to 21 are provided with various shift aiding structures that aid in performing an upshifting operation from a larger diameter sprocket to a smaller diameter sprocket and/or a downshifting operation from a smaller diameter sprocket to a larger diameter sprocket. However, the configuration of the sprockets 11 to 21 can have any configuration as needed and/or desired.

In the illustrated embodiment, the bicycle sprocket assembly 10 further includes a first sprocket support member 22 and a second sprocket support member 23. The sprocket support member 22 supports and axially spaces the sprockets 13, 14 and 15. The sprocket support member 23 supports and axially spaces the sprockets 11 and 12. On the other hand, the sprockets 16 to 21 are designed to be supported directly on a conventional freewheel (not shown) of a rear hub (not shown) in a relatively conventional manner.

The bicycle sprocket assembly 10 further includes a plurality of axial spacers 26 that axially spaces the sprockets 16 to 19. A locking ring 28 is provided for attaching the bicycle sprocket assembly 10 to a freewheel in a conventional manner. The sprockets 11 to 21 and the axial spacers 26 are fixedly mounted on a conventional freewheel by the locking ring 28. In this way, the sprockets 11 to 21 rotate together about a center rotational axis A. The sprockets 11 to 21 typically rotate together in a clockwise direction as viewed in FIG. 1 (e.g., in a forward rotational direction) when the rider is pedaling in a forward (clockwise) direction to propel the bicycle in a forward direction. The spacers 26 and the locking ring are conventional structures that are well known in the bicycle component field.

In the illustrated embodiment, the sprocket support member 23 is a relatively conventional sprocket support member that has a freewheel engaging portion 30 and a plurality of sprocket mounting portions 32. The sprocket support member 23 is a one-piece, unitary member that is made of a suitable rigid material. For example, the sprocket support member 23 can be made of rigid resin materials or lightweight metallic materials such as aluminum. Since the sprocket support member 23 is a relatively conventional sprocket support member, the sprocket support member 23 will only be briefly discussed.

Figure 4:
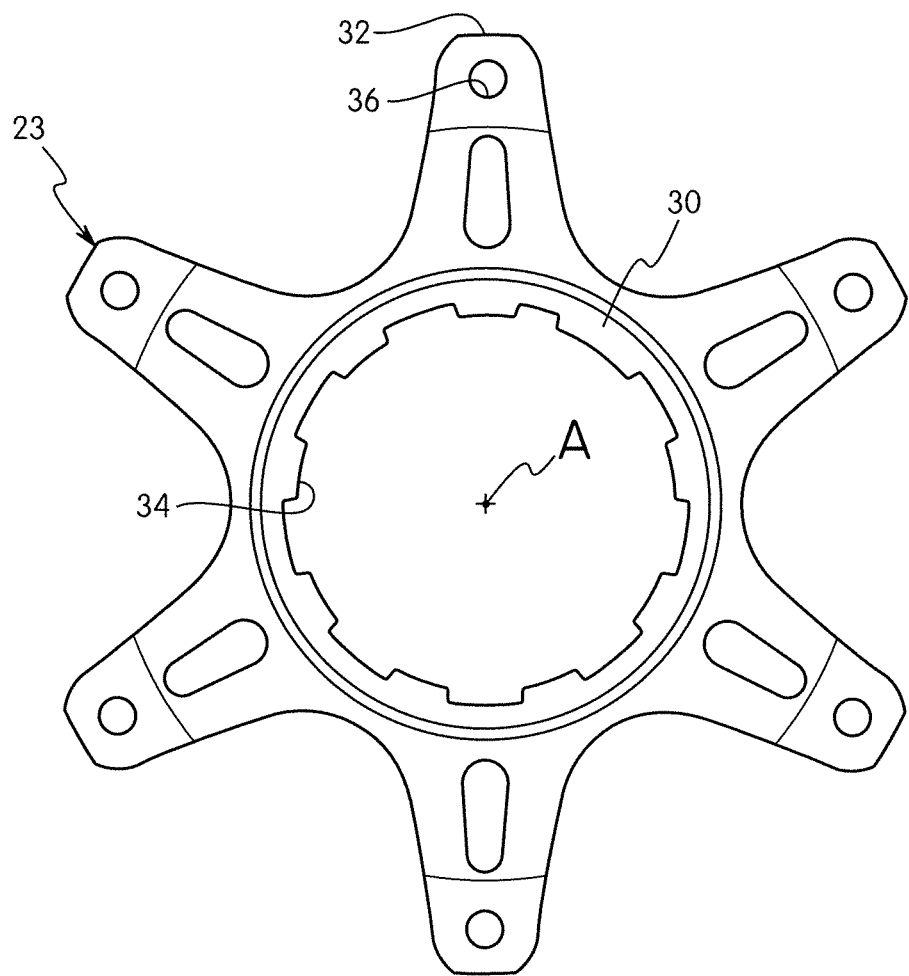
FIG. 4 is a side elevational view of the large or low sprocket support member of the bicycle sprocket assembly illustrated in FIGS. 1 to 3 as viewed from the small or top sprocket facing side of the sprocket support member.
Figure 5:
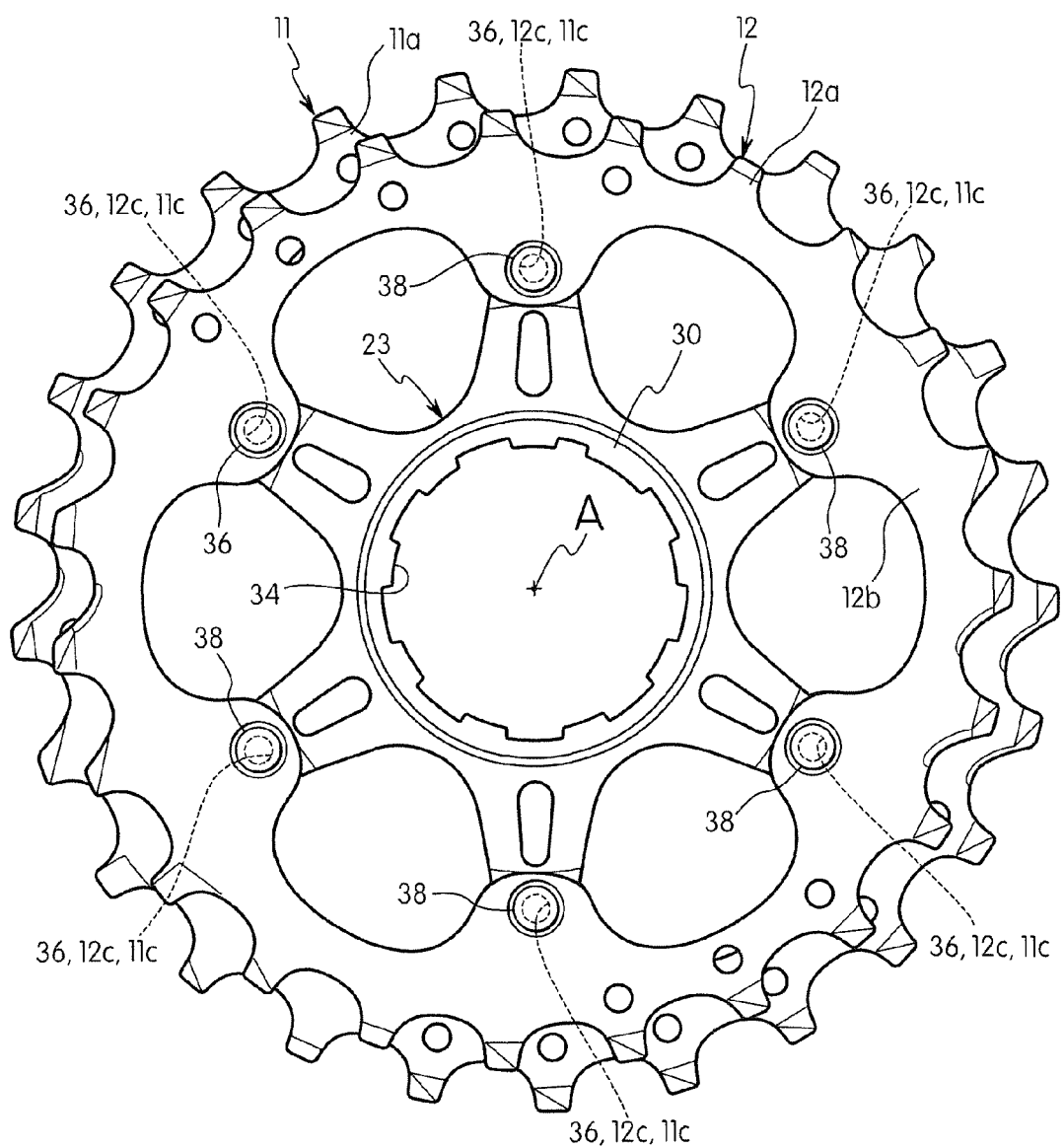
FIG. 5 is a side elevational view of the large or low sprocket support member illustrated in FIG. 4, but with two sprocket mounted thereto.
Figure 6:
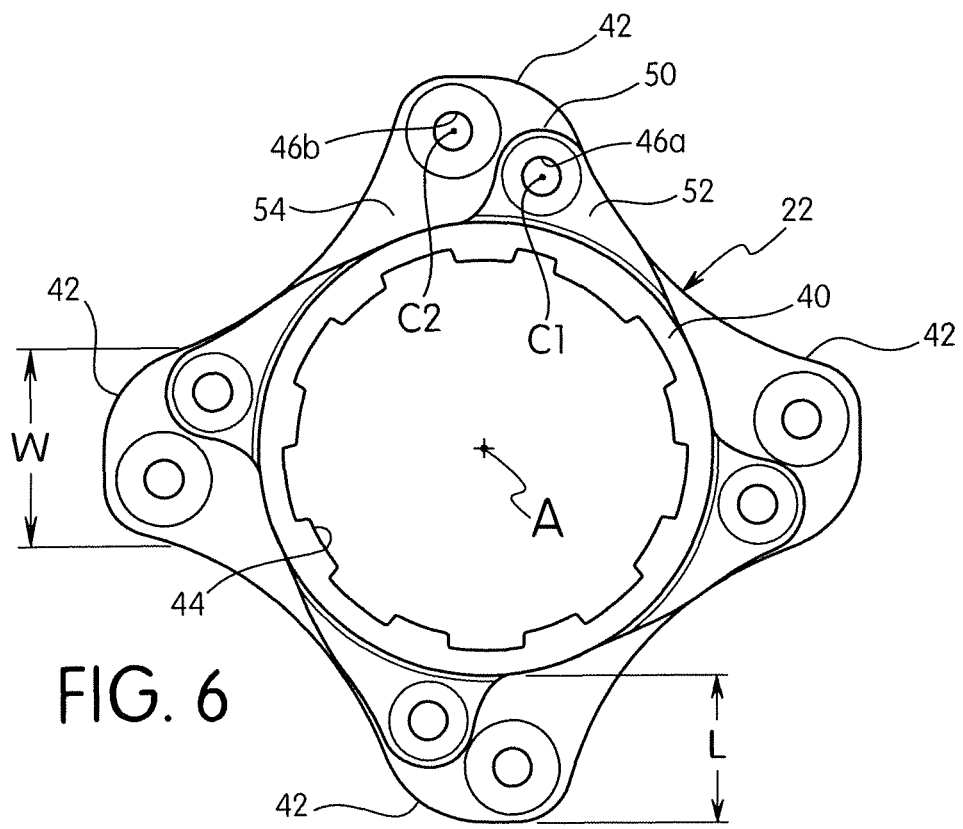
FIG. 6 is a side elevational view of the small or top sprocket support member of the bicycle sprocket assembly illustrated in FIGS. 1 to 3 as viewed from the small or top sprocket facing side of the sprocket support member.
Figure 7:
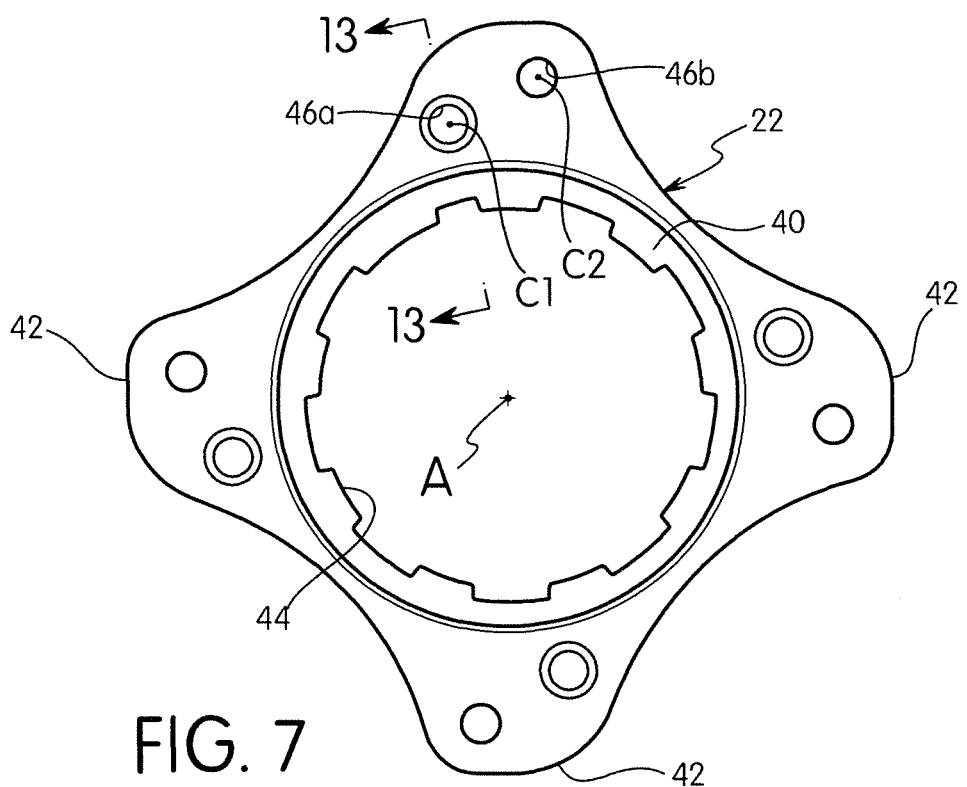
FIG. 7 is a side elevational view of the small or top sprocket support member of the bicycle sprocket assembly illustrated in FIGS. 1 to 3 as viewed from the large sprocket facing side of the sprocket support member.
Figure 8:
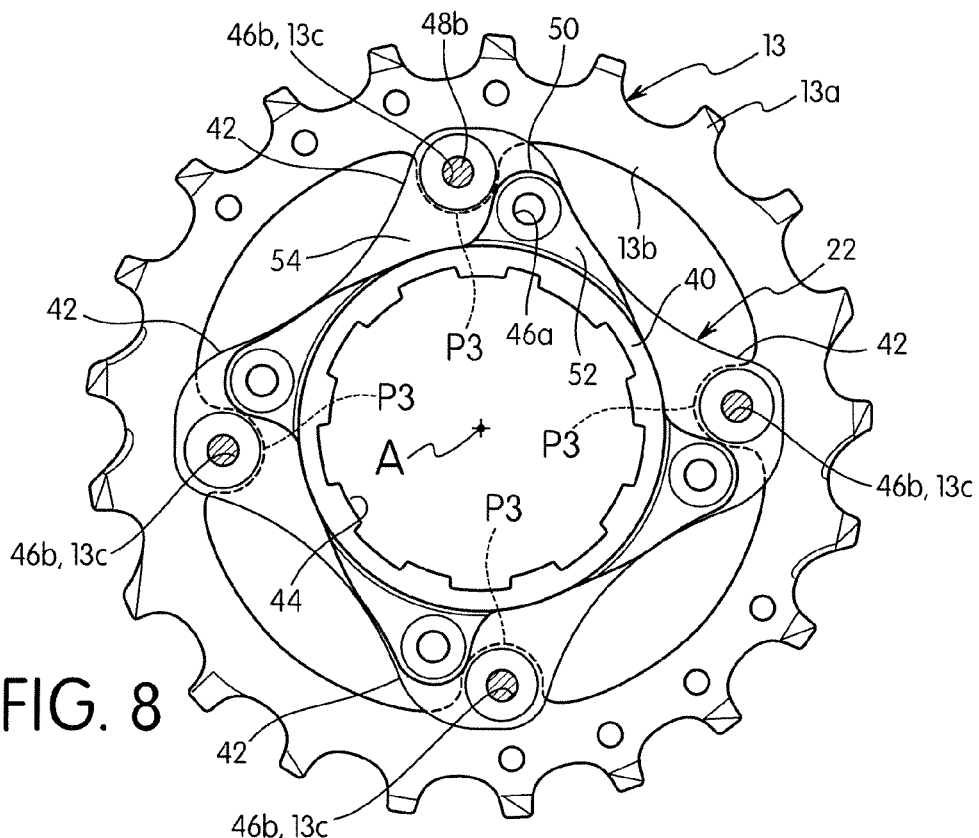
FIG. 8 is a side elevational view of the small or top sprocket support member illustrated in FIG. 6, but with one sprocket mounted thereto.
Figure 9:
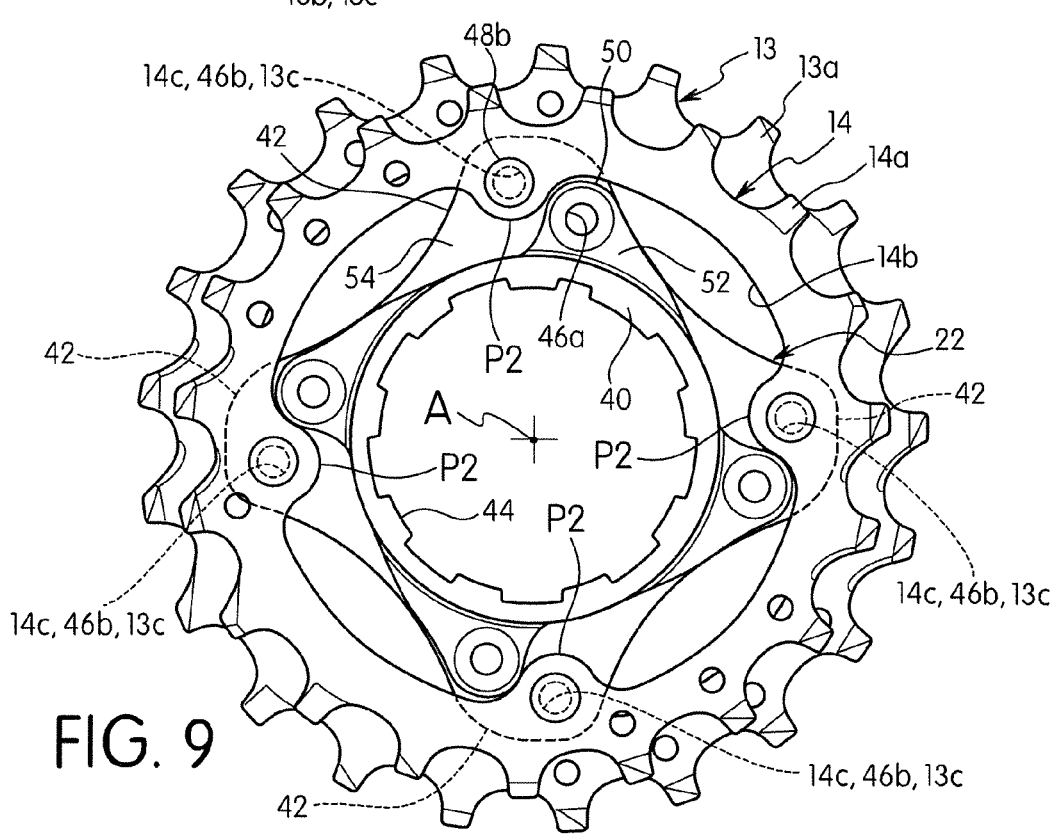
FIG. 9 is a side elevational view of the small or top sprocket support member illustrated in FIG. 6, but with two sprocket mounted thereto.

As seen in FIGS. 3 to 5, the freewheel engaging portion 30 has a splined opening 34 with a plurality of freewheel engaging splines. The splines of the splined opening 34 are dimensioned to non-rotatably engage splines of a conventional freewheel (not shown) of a rear hub (not shown) in a relatively conventional manner. Preferably, the splined opening 34 is configured so that the sprocket support member 23 can only fit on the freewheel (not shown) in a single orientation. The sprocket mounting portions 32 extend radially outwardly from the freewheel engaging portion 30. Each of the sprocket mounting portions 32 has a single sprocket mounting opening 36 that receives a fastener 38 for fixedly mounting the sprockets 11 and 12. Thus, the sprockets 11 and 12 are fixed to the sprocket mounting portions 32 of the sprocket support member 23 by a common one of the fasteners 38 in each of the sprocket mounting portions 32. In the illustrated embodiment, the fasteners 38 are rivets.

The sprockets 11 and 12 include outer peripheral portions 11a and 12a, respectively, that defines a plurality of teeth of the sprockets 11 and 12, respectively. The teeth of the outer peripheral portions 11a and 12a of the sprockets 11 and 12 constitute chain engaging portions. Also the sprockets 11 and 12 include inner peripheral portions 11b and 12b, respectively. Each of the inner peripheral portions 11b and 12b defines an opening that is free of any freewheel engaging splines. Each of the inner peripheral portions 11b and 12 b defines a plurality of radially protruding portions with mounting openings 11c and 12c, respectively. As seen in FIG. 5, the mounting openings 11c and 12c are aligned with the sprocket mounting openings 36 for receiving the fasteners 38.

In the illustrated embodiment, as seen in FIGS. 2 and 3, the first sprocket support member 22 together with the sprockets 13, 14 and 15 also constitutes a bicycle sprocket assembly or a sub-bicycle sprocket assembly of the bicycle sprocket assembly 10. The sprocket support member 22 is a one-piece, unitary member that is preferably made of a non-metallic material, such as a fiber-reinforced material, e.g. a carbon fiber-reinforced resin.

In this sub-bicycle sprocket assembly, the sprocket 15 constitutes a first sprocket, the sprocket 14 constitutes a second sprocket and the sprocket 13 constitutes a third sprocket. The third sprocket 13 is the largest sprocket of the sprockets 13, 14 and 15 that are directly mounted to the first sprocket support member 22 as an integrated bicycle sprocket assembly. Thus, the third sprocket 13 has the largest maximum diameter of the sprockets 13, 14 and 15 that are directly mounted to the first sprocket support member 22. On the other hand, the first sprocket 15 is the smallest sprocket of the sprockets 13, 14 and 15 that are directly mounted to the first sprocket support member 22. Thus, the first sprocket 15 has the smallest maximum diameter of the sprockets 13, 14 and 15 that are directly mounted to the first sprocket support member 22. Moreover, each of the sprockets 13, 14 and 15 has a first sprocket side surface and a second sprocket side surface. In the illustrated embodiment, the first sprocket side surface of each of the sprockets 13, 14 and 15 refers to the sprocket side that faces towards the smaller sprocket(s), while the second sprocket side surface of each of the sprockets 13, 14 and 15 refers to the sprocket side that faces towards the larger sprocket(s).

As seen in FIGS. 2 and 3, the sprockets 13, 14 and 15 include outer peripheral portions 13a, 14a and 15a, respectively, that defines a plurality of teeth of the sprockets 13, 14 and 15, respectively. The teeth of the outer peripheral portions 13a, 14a and 15a of the sprockets 13, 14 and 15 constitute chain engaging portions. Also the sprockets 13, 14 and 15 include inner peripheral portions 13b, 14b and 15b, respectively. Each of the inner peripheral portions 13b, 14b and 15b defines an opening that is free of any freewheel engaging splines. The inner peripheral portion 15b defines a plurality of first radially protruding portions P1 with each having a mounting opening 15c. The inner peripheral portion 14b defines a plurality of second radially protruding portions P2 with each having a mounting opening 14c. The inner peripheral portion 13b defines a plurality of third radially protruding portions P3 with each having a mounting opening 13c.

Still referring to FIGS. 2 and 3, the sprockets 16, 17, 18, 19, 20 and 21 include outer peripheral portions 16a, 17a, 18a, 19a, 20a and 21a, respectively, that defines a plurality of teeth for each of the sprockets 16, 17, 18, 19, 20 and 21, respectively. Also the sprockets 16, 17, 18, 19, 20 and 21 include inner peripheral portions 16b, 17b, 18b, 19b, 20b and 21b, respectively, that each define an opening having a plurality of freewheel engaging splines. The inner peripheral portion 20b of the sprocket 20 is formed with an integrated spacer portion. Similarly, the inner peripheral portion 21b of the sprocket 21 is formed with integrated spacer portion. Since the sprockets 16, 17, 18, 19, 20 and 21 can be relatively conventional sprockets, the sprockets 16, 17, 18, 19, 20 and 21 will not be discussed in further detail.

Referring now to FIGS. 6 to 13, the sprocket support member 22 will now be discussed in more detail. As mentioned above, the sprocket support member 22 supports the sprockets 13, 14 and 15. The sprocket support member 22 includes a first axial face (FIG. 6) and a second axial face (FIG. 7) that faces in an opposite direction with respect to the center rotational axis A of the bicycle sprocket assembly 10. The sprockets 14 and 15 are both disposed on the first axial face of the sprocket support member 22 without any intervening sprockets disposed between the sprockets 14 and 15. The sprocket 13 is disposed on the second axial face of the sprocket support member 22 without any intervening sprockets disposed between the sprockets 13 and 14.

In the illustrated embodiment, the sprocket support member 22 has a freewheel engaging portion 40 and a plurality of sprocket mounting portions or spider arms 42. The freewheel engaging portion 40 has a splined opening 44 with a plurality of freewheel engaging splines. The splines of the splined opening 44 are dimensioned to non-rotatably engage splines of a conventional freewheel (not shown) of a rear hub (not shown) in a relatively conventional manner. Preferably, the splined opening 44 is configured so that the sprocket support member 22 can only fit on the freewheel (not shown) in a single orientation.

The sprocket mounting portions 42 extend radially outwardly from the freewheel engaging portion 40.

Figure 10:
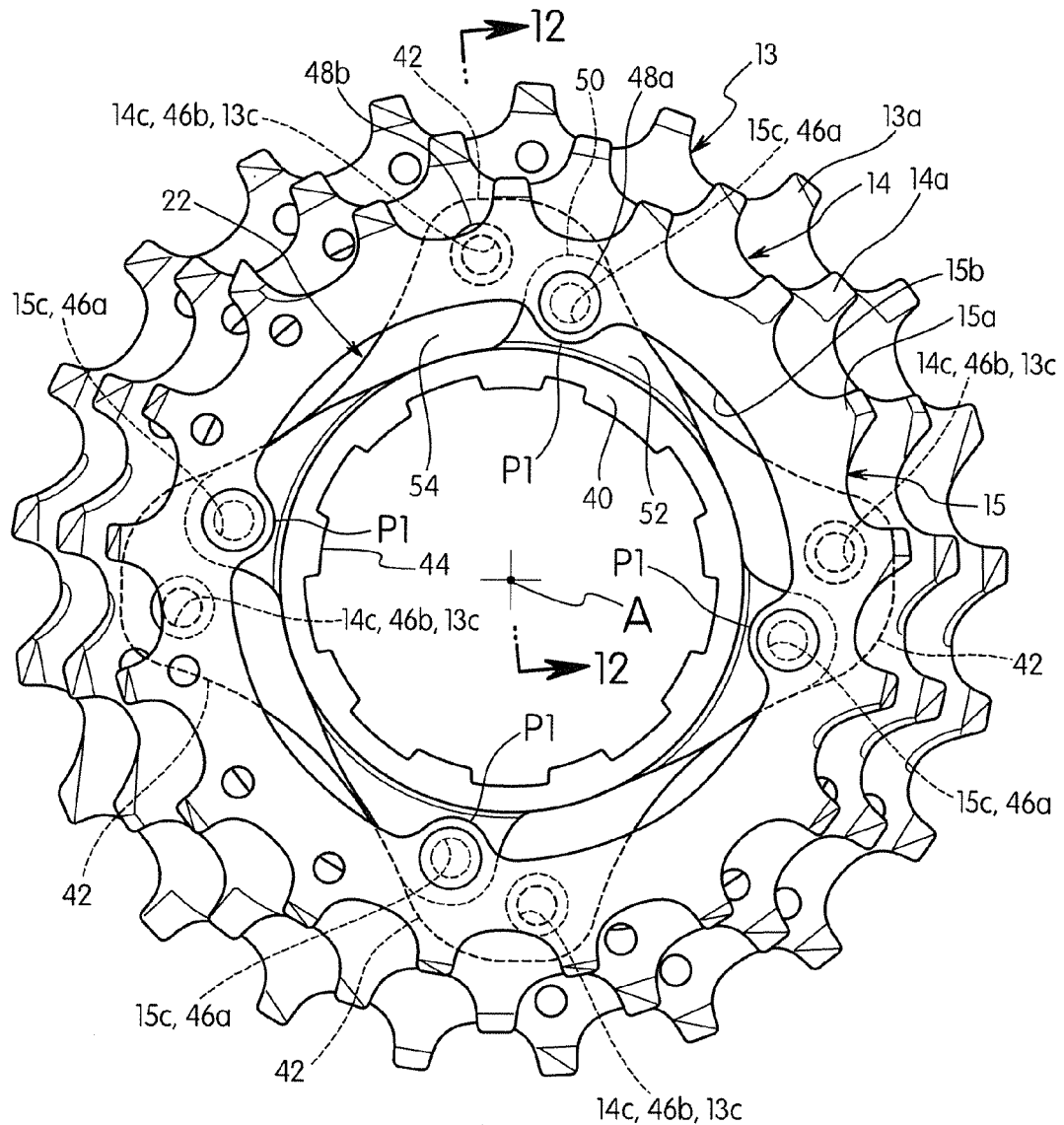
FIG. 10 is a side elevational view of the small or top sprocket support member illustrated in FIG. 6, but with three sprocket mounted thereto.
Figure 12:
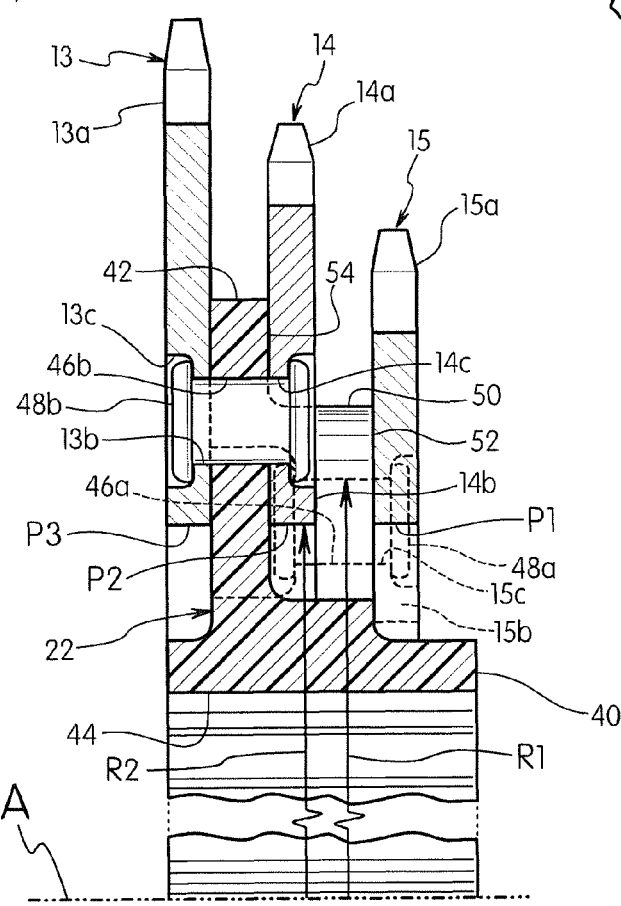
FIG. 12 is an enlarged, partial cross sectional view of the bicycle sprocket assembly as seen along section line 12-12 of FIG. 10.

Each of the sprocket mounting portions 42 has a first or inner sprocket mounting opening 46a with a center axis C1 and a second or outer sprocket mounting opening 46b with a center axis C2. As seen in FIGS. 10 and 12, the mounting openings 15c are aligned with the sprocket mounting openings 46a for receiving the first fasteners 48a. Also as seen in FIGS. 10 and 12, the mounting openings 13c and 14c are aligned with the sprocket mounting openings 46b for receiving the second fasteners 48b. The sprocket mounting openings 46a is circumferentially offset from the second sprocket mounting openings 46b with respect to the center rotational axis A of the bicycle sprocket assembly 10 for each of the sprocket mounting portions 42. The first and second sprocket mounting openings 46a and 46b are arranged with respect to the center rotational axis A of the bicycle sprocket assembly 10 such that the deformed head portions of the first and second fasteners 48a and 48b radially overlap relative to the center rotational axis A. In other words, as best seen in FIG. 12, the outermost edges of the deformed head portions of the first fasteners 48a is spaced farther from the center rotational axis A than the innermost edges of the deformed head portions of the second fasteners 48b. While the deformed head portions of the first fasteners 48a radially overlap with the deformed head portions of the second fasteners 48b relative to the center rotational axis A in the illustrated embodiment, other arrangements are possible.

With this arrangement of the first and second sprocket mounting openings 46a and 46b, each of the sprocket mounting portions 42 has a radial length L that is smaller than conventional spider arms of a conventional sprocket support member with the same number of sprockets. Also with this arrangement of the first and second sprocket mounting openings 46a and 46b, each of the sprocket mounting portions 42 has a circumferential width W that is larger than conventional spider arms of a conventional sprocket support member with the same number of sprockets. As a result, carbon material can be more easily used for the material of the sprocket support member 22 than for conventional spider arms, because such short and wide mounting portions are preferable for carbon conventional spider arms.

Each of the first sprocket mounting openings 46a receives a first or inner fastener 48a for fixedly mounting the radially protruding portions P1 of the sprocket 15 to the sprocket support member 22 via the mounting openings 15c of the sprocket 15. Thus, the radially protruding portions P1 of the sprocket 15 are fixed to corresponding ones of the sprocket mounting portions 42 of the sprocket support member 22 at the sprocket mounting openings 46a by the fasteners 48a. In the illustrated embodiment, the fasteners 48a are rivets. In this way, the sprocket 15 is fixed to the sprocket support member 22 by the fasteners 48a, which do not directly connect any other spacers or sprockets to the sprocket support member 22.

Each of the second sprocket mounting openings 46b receives a second or outer fastener 48b for fixedly mounting the sprockets 13 and 14 to the sprocket support member 22. Thus, the radially protruding portions P3 of the sprocket 13 and the radially protruding portions P2 of the sprocket 14 are fixed to corresponding ones of the sprocket mounting portions 42 of the sprocket support member 22 at the second sprocket mounting openings 46b by a common one of the fasteners 48b in each of the second sprocket mounting openings 46b of the sprocket mounting portions 42. In the illustrated embodiment, the fasteners 48b are rivets. In this way, the sprockets 13 and 14 are fixed to the sprocket support member 22 by the fasteners 48b (e.g., at least one common fastener), which do not directly connect any other spacers or sprockets to the sprocket support member 22.

As seen in FIG. 12, each of the sprocket mounting portions 42 has a step shaped configuration for axially spacing the sprockets 14 and 15. In particular, each of the sprocket mounting portions 42 has an outwardly facing surface 50 extending axially between a first sprocket mounting surface 52 and a second sprocket mounting surface 54. Thus, the sprocket 15 directly contacts the first sprocket mounting surface 52 and the sprocket 14 directly contacts the second sprocket mounting surface 54 with the sprockets 14 and 15 being axially spaced apart by the outwardly facing surface 50.

Figure 11:
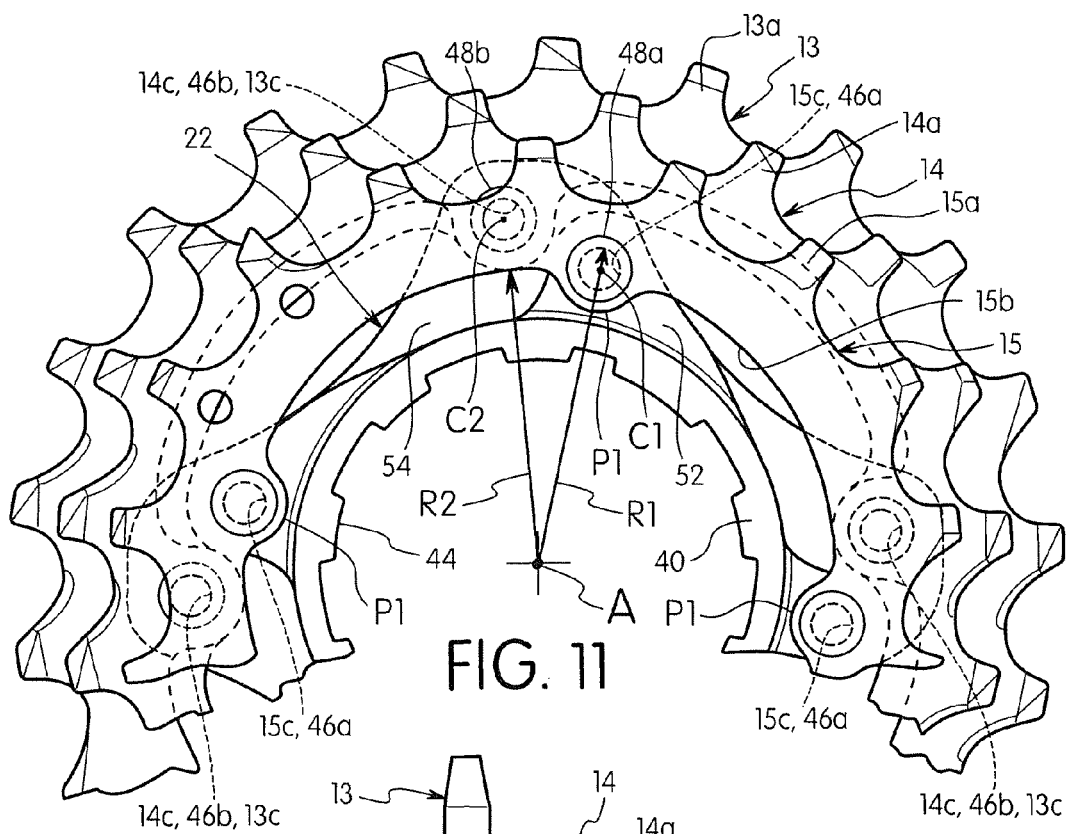
FIG. 11 is an enlarged elevational view of a portion of the bicycle sprocket assembly illustrated in FIG. 10.

As seen in FIGS. 11 and 12, the radially outermost edges of the first sprocket mounting openings 46a are spaced from the center rotational axis A of the bicycle sprocket assembly 10 by a first radial distance R1. Also the radially innermost points of the radially protruding portions P2 of the sprocket 14 are spaced from the center rotational axis A of the bicycle sprocket assembly 10 by a second radial distance R2. The second radial distance R2 is smaller than the first radial distance R1. Thus, the radially protruding portions P2 of the sprocket 14 radially overlap with the radially outermost edges of the first sprocket mounting openings 46a relative to the center rotational axis A. As a result of the radially outermost edges of the first sprocket mounting openings 46a radially overlapping with the radially innermost edge of the sprocket 14, the overall radial dimension of the sprocket 14 can be smaller than a conventional sprocket having the same total number of teeth. In other words, with this radially overlapping arrangement, a weight-saving of the sprockets 14 and 15 and/or the sprocket support member 22 can be achieved as compared to a conventional sprocket assembly having three sprockets with the same total number of teeth.

Referring to FIG. 15, an alternative bicycle sprocket assembly is illustrated in a cross section in accordance with another illustrated embodiment. The alternative bicycle sprocket assembly includes a sprocket support member 122 that supports the sprockets 13, 14 and 15 in the same manner as the sprocket support member 22. The only difference between the sprocket support member 22 and the sprocket support member 122 is that the sprocket support member 122 is made of a metallic material such as aluminum or iron instead of a fiber-reinforced material. Thus, description of the sprocket support member 22 applies to the sprocket support member 122.

To better understand the above description of the sprocket assembly 10, some of the terms will now be further explained for the sake of clarity. As used herein, the term "smaller sprocket" refers to a sprocket having a smaller diameter with respect to the claimed sprocket and the term "larger sprocket" refers to a sprocket having a larger diameter with respect to the sprocket in question. As used herein, the term "smaller sprocket facing side surface" refers to a side surface of the sprocket in question that faces a sprocket having a smaller diameter with respect to the sprocket in question and the term "larger sprocket facing side surface" refers to a side surface of the sprocket in question that faces a sprocket having a larger diameter with respect to the sprocket in question. As used herein, the term "adjacent sprocket" refers to an immediate adjacent sprocket to a sprocket in question with no intervening sprockets located between the "adjacent sprocket" and the sprocket in question. The absence of the use of the modifying term "at least one" before another term should not be construed to preclude additional ones of the modified terms. As used herein, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms "fixed" or "secured", as used herein, encompass configurations in which an element is directly secured to another element by affixing the element directly to the other element; configurations in which an element is indirectly secured to another element by affixing the element to intermediate member(s) which in turn are affixed to the other element; and configurations in which one element is integral with another element, i.e. one element is essentially part of the other element. This definition also applies to words of similar meaning, for example the terms "joined" and "attached" and their derivatives. Finally, terms of degree such as "substantially", "about" and "approximately" as used herein mean a reasonable amount of deviation of the modified term such that the end result is not significantly changed.

While only selected embodiments have been chosen to illustrate the sprocket assembly of the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them, unless otherwise specified. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle sprocket assembly comprising:
    a first sprocket including an outer peripheral portion defining a plurality of first teeth and an inner peripheral portion defining a first opening that is free of any freewheel engaging splines, the inner peripheral portion of the first sprocket having a plurality of first radially protruding portions;
    a second sprocket including an outer peripheral portion defining a plurality of second teeth and an inner peripheral portion defining a second opening that is free of any freewheel engaging splines, the inner peripheral portion of the second sprocket having a plurality of second radially protruding portions, a total number of the second teeth being larger than a total number of the first teeth; and
    a sprocket support member including a freewheel engaging portion and a plurality of sprocket mounting portions extending radially outwardly from the freewheel engaging portion, each of the sprocket mounting portions having first sprocket mounting opening and a second sprocket mounting opening, the sprocket support member being a one-piece member dial is non-separable,
    one of the first radially protruding portions of the first sprocket being fixed to the sprocket support member at one of the first sprocket mounting openings and one of the second radially protruding portions of the second sprocket being fixed to the sprocket support member at one of the second sprocket mounting openings,
    the first sprocket mounting opening being circumferentially offset from the second sprocket mounting opening with respect to a center rotational axis of the bicycle sprocket assembly,
    a radially innermost edge of each of the second radially protruding portions being spaced from the center rotational axis of the bicycle sprocket assembly by a radial distance that is smaller than a radial distance of a radially outermost edge of each of the first sprocket mounting openings with respect to the center rotational axis of the bicycle sprocket assembly.

2. The bicycle sprocket assembly according to claim 1, wherein
    each of the second sprocket mounting openings has a radially innermost edge that is spaced from the center rotational axis of the bicycle sprocket assembly by a radial distance that is smaller than a radial distance of radially outermost edges of the first sprocket mounting openings with respect to the center rotational axis of the bicycle sprocket assembly.

3. The bicycle sprocket assembly according to claim 1, wherein
the sprocket support member includes a first axial face and a second axial face that faces in an opposite direction with respect to the center rotational axis of the bicycle sprocket assembly, the first and second sprockets both being disposed on the first axial face of the sprocket support member without any intervening sprockets disposed between the first and second sprockets.

4. The bicycle sprocket assembly according to claim 1, wherein
the sprocket support member is made of a non-metallic material.

5. The bicycle sprocket assembly according to claim 4, wherein
the sprocket support member is made of a fiber-reinforced material.

6. The bicycle sprocket assembly according to claim 1, wherein
the sprocket support member is made of a metallic material.

7. The bicycle sprocket assembly according to claim 6, wherein
the sprocket support member is made of aluminum.

8. The bicycle sprocket assembly according to claim 6, wherein
the sprocket support member is made of iron.

9. A bicycle sprocket assembly comprising:
a first sprocket including an outer peripheral portion defining a plurality of first teeth and an inner peripheral portion defining a first opening that is free of any freewheel engaging splines, the inner peripheral portion of the first sprocket having a plurality of first radially protruding portions;
a second sprocket including an outer peripheral portion defining a plurality of second teeth and an inner peripheral portion defining a second opening that is free of any freewheel engaging splines, the inner peripheral portion of the second sprocket having a plurality of second radially protruding portions, a total number of the second teeth being larger than a total number of the first teeth;
a third sprocket including an outer peripheral portion defining a plurality of third teeth and an inner peripheral portion defining a third opening that is free of any freewheel engaging splines; and
a sprocket support member including a freewheel engaging portion and a plurality of sprocket mounting portions extending radially outwardly from the freewheel engaging portion, each of the sprocket mounting portions having a first sprocket mounting opening and a second sprocket mounting opening, the sprocket support member including a first axial face and a second axial face that faces in an opposite direction with respect to the center rotational axis of the bicycle sprocket assembly, the first and second sprockets both being disposed on the first axial face of the sprocket support member without any intervening sprockets disposed between the first and second sprockets, the third sprocket being disposed on the second axial face of the sprocket support member without any intervening sprockets disposed between the second and third sprockets,
one of the first radially protruding portions of the first sprocket being fixed to the sprocket support member at the first sprocket mounting opening, and one of the second radially protruding portions of the second sprocket being fixed to the sprocket support member at the second sprocket mounting opening,
the first sprocket mounting opening being circumferentially offset from the second sprocket mounting opening with respect to a center rotational axis of the bicycle sprocket assembly,
a radially innermost edge of the second radially protruding portion being spaced from the center rotational axis of the bicycle sprocket assembly by a radial distance that is smaller than a radial distance of the radially outermost edge of the first sprocket mounting openings with respect to the center rotational axis of the bicycle sprocket assembly.

10. The bicycle sprocket assembly according to claim 9, wherein
the second and third sprockets are fixed to the sprocket support member at the second sprocket mounting openings by a common fastener in each of the sprocket mounting portions.

11. The bicycle sprocket assembly according to claim 9, wherein
each of the second sprocket mounting openings has a radially innermost edge that is spaced from the center rotational axis of the bicycle sprocket assembly by a radial distance that is smaller than a radial distance of radially outermost edges of the first sprocket mounting openings with respect to the center rotational axis of the bicycle sprocket assembly.

12. The bicycle sprocket assembly according to claim 9, wherein
the sprocket support member is made of a non-metallic material.

13. The bicycle sprocket assembly according to claim 12, wherein
the sprocket support member is made of a fiber-reinforced material.

14. The bicycle sprocket assembly according to claim 9, wherein
the sprocket support member is made of a metallic material.

15. The bicycle sprocket assembly according to claim 14, wherein
the sprocket support member is made of aluminum.

16. The bicycle sprocket assembly according to claim 14, wherein
the sprocket support member is made of iron.

* * * * *